United States Patent [19]

Nett

[11] 4,066,425
[45] Jan. 3, 1978

[54] VENTILATING APPARATUS INCLUDING EXHAUST FILTER EXCHANGER

[76] Inventor: Louis A. Nett, P.O. Box 199N, R.R. No. 1, Cambridge, Wis. 53523

[21] Appl. No.: 718,842

[22] Filed: Aug. 30, 1976

[51] Int. Cl.² .............................................. B01D 35/02
[52] U.S. Cl. ................................... 55/242; 55/385 R; 55/422; 55/478; 55/493; 55/504; 55/509; 55/DIG. 36; 126/299 D
[58] Field of Search ................. 55/422, 436, 478, 242, 55/DIG. 36, 271–273, 385 R, 440, 509, 475, 481, 493, 504; 126/299 A, 299 D

[56] References Cited

U.S. PATENT DOCUMENTS

| | | | |
|---|---|---|---|
| 1,407,311 | 2/1922 | Witte | 55/422 X |
| 1,984,135 | 12/1934 | Houston | 55/509 X |
| 2,867,913 | 1/1959 | Faucher | 55/422 X |
| 2,925,144 | 2/1960 | Kroll | 55/422 X |
| 3,242,652 | 3/1966 | Malenchini | 55/242 X |
| 3,393,498 | 7/1968 | Schoen | 55/501 X |
| 3,566,585 | 3/1971 | Voloshen et al. | 55/443 X |
| 3,593,503 | 7/1971 | Andrews | 55/509 X |
| 3,805,685 | 4/1974 | Carns | 55/242 X |
| 3,838,977 | 10/1974 | Warren | 55/475 X |
| 3,910,782 | 10/1975 | Struble et al. | 55/464 X |

OTHER PUBLICATIONS

"Design of Grease Filter Equipped Kitchen Exhaust Systems," Form No. GF1536, Research Products Corp., Madison, Wisconsin, 10-3-63.

Primary Examiner—Frank W. Lutter
Assistant Examiner—Kathleen J. Prunner
Attorney, Agent, or Firm—Harry C. Engstrom; Theodore J. Long

[57] ABSTRACT

An exhaust hood with filter apparatus and having at least a fume collection chamber, an exhaust chamber and an interior wall therebetween having an opening therein through which the collected fumes may pass to exhaust. An exhaust filter exchanger is mounted in the exhaust chamber and has at least two filter holders each for holding at least one filter, with one of the filter holders being in an operating position across the opening in the wall between the two chambers and the other of the filter holders being in a reserve position within the exhaust chamber. The filter exchanger apparatus allows an attendant to retract, rotate, and extend the filter holders (and filters therein) to exchange their positions. Spray nozzles are provided within the exhaust chamber to wash the filters held in the reserve position without removal from the hood. The filter holders are designed to release the filters and the hood includes an access opening to allow the attendant to enter and remove the filter or filters held by the filter holder which is in the reserve position.

4 Claims, 6 Drawing Figures

4,066,425

VENTILATING APPARATUS INCLUDING EXHAUST FILTER EXCHANGER

BACKGROUND OF THE INVENTION

1. Field of the Invention

This invention pertains generally to ventilating apparatus and more particularly to exhaust hoods for ventilating fumes from a stove, grill, or other commercial, home, or industrial work area.

2. Description of the Prior Art

Exhaust hoods such as are utilized in restaurant kitchens, industrial work areas, and the like commonly consisto of a hood enclosure, spaced somewhat above the stove, grill or other fume producing area, which draws fume laden air into the hood by means of the low air pressure produced within the hood area by an exhaust fan. Such hoods may also utilize the injection of outside air into the fume collection chamber of the hood to increase the draw of the hood to minimize the volume of tempered air withdrawn from the room. Filters are generally employed in the exhaust hood between the fume collection chamber and the exhaust chamber to substantially remove the droplets of grease, particulate matter, and the like which may be entrained with the fumes which are drawn into the exhaust hood.

If a sufficient proportion of the grease for instance is not removed by the filter, such grease will tend to collect and congeal on the exhaust ductwork of the ventilating apparatus, and around the exhaust fan opening on the roof of the building being ventilated. This collection of grease inhibits the flow of air through the ductwork and presents a substantial fire hazard. Moreover, inefficiency of the filter caused by overloading of the filter with grease and other foreign matter greatly reduces the air flow through the filter, and thus reduces the efficiency of the ventilating apparatus. Frequent periodic cleaning of the filters is required in any installation where fume laden air is being drawn into the exhaust apparatus over a substantial period of time. The cleaning of filters of grease and other matter in present ventilating systems involves manual removal of the filters by an attendant, which generally requires that the ventilating apparatus and the cooking facilities or other fume generating device which it ventilates be shut down during the cleaning operation. Such manual cleaning may substantially reduce the productivity of the operation such as cooling facilities where the grease filters may require cleaning several times a day to maintain top efficiency. Additional problems are encountered during manual removal of the filters, including, for instance, incidental dropping of accumulated grease onto the cooling area during the removal and cleaning procedure.

SUMMARY OF THE INVENTION

The exhaust hood and filter apparatus of my ventilating apparatus provides for quick and easy cleaning of the filters without interrupting the ventilation process. My apparatus may be utilized with exhaust hoods which simply draw the fumes from the area beneath the hood by means of a vacuum exhaust fan, or with hoods of the type which additionally utilize the injection of untempered outside air into the fume collection chamber of the hood to aid in withdrawal of fumes. My apparatus provides a clean filter for uninterrupted operation while the clogged filter is being washed within the hood enclosure or, alternatively, removed for cleaning.

My apparatus includes a ventilating hood having walls therein defining at least a fume collection chamber and an exhaust chamber, with an opening being provided in the interior wall which separates the two chambers and through which collected fumes to be exhausted pass. An exhaust filter exchanger is mounted in the exhaust chamber and includes at least two filter holders for releasably holding filters. One of the filter holders will be in an operating or filtering position in the opening between the fume collection chamber and the exhaust chamber. The other of the filter holders will hold a second filter in reserve within the exhaust chamber in a position accessable to an attendant through an access door in the back of the hood.

The filter exchanger is responsive to the operation by the attendant of a lever exterior of the hood enclosure to retract the filter holders a sufficient distance to allow them to clear the edges of the interior wall opening when they are rotated by the attendant's rotation of the lever. When the filter holders have reached the proper positions, the attendant may then manipulate the lever to extend the filter holders such that one of the filter holders will be in the operating position.

The operation of the filter exchanger may be controlled automatically by an electric motor and timing mechanism (not shown), to automatically retract the filter holders, rotate them to their new positions, and extend them such that one of the filter holders is in the operating position.

Wash nozzles are provided within the exhaust chamber to spray a cleaning solution on the filter held in the reserve position. A drainage opening is provided through which the cleaning solution may be drained. The operation of the washing nozzles may be controlled manually by the operator from outside the hood enclosure or automatically by the timing mechanism which also controls the interchange of the filter holders.

Further objects, features, and advantages of my invention will be apparent from the following detailed description taken in conjunction with the accompanying drawings showing a preferred embodiment of the ventilating apparatus exemplifying the principles of my invention.

DESCRIPTION OF THE PREFERRED EMBODIMENTS

Figures 1, 6:
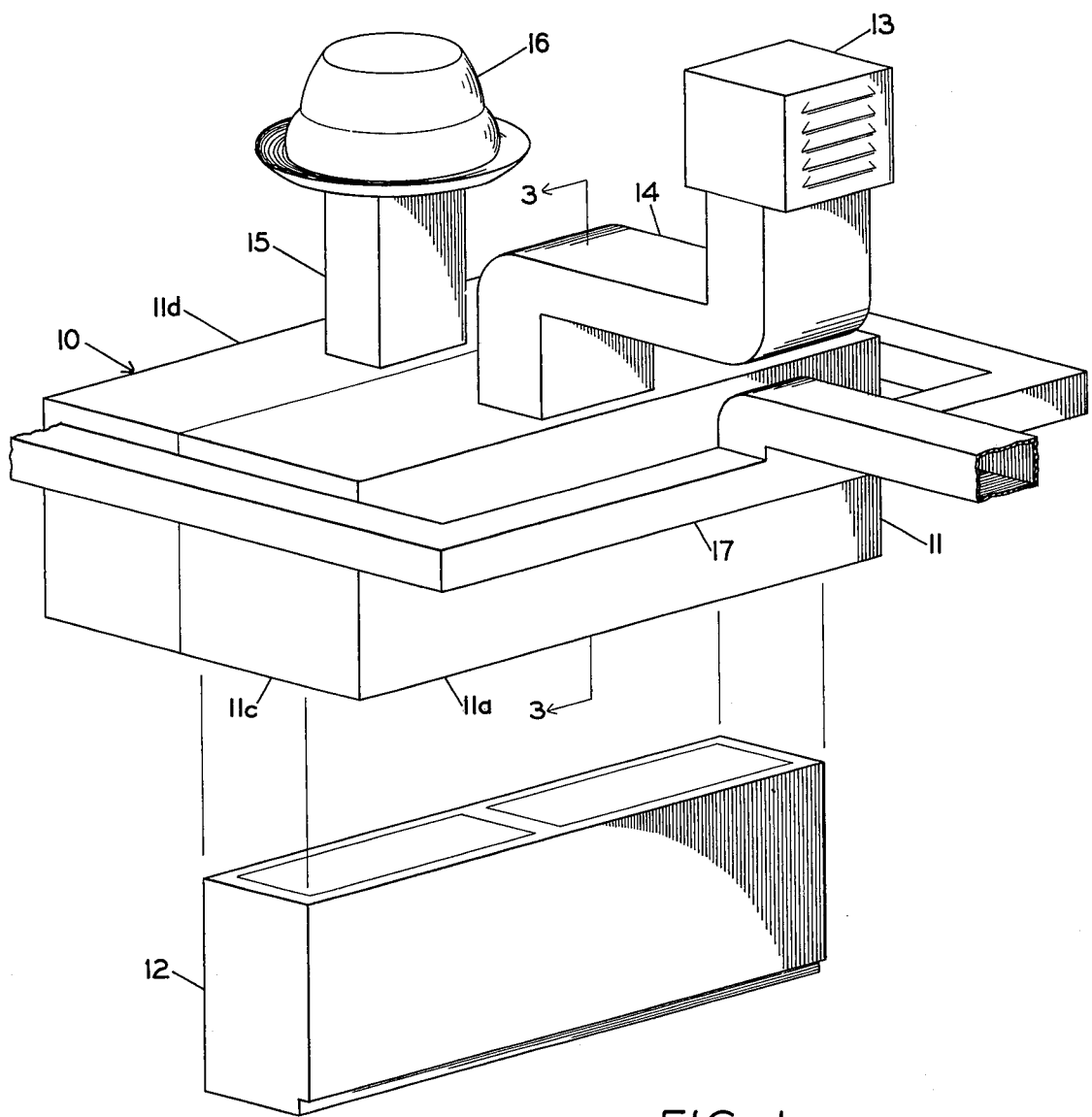
FIG. 1 is a perspective view of my ventilating apparatus mounted above a stove for illustrative purposes.
FIG. 6 is a cross-sectional view of a filter holder and a filter held therein.

Referring now more particularly to the drawings, wherein like numerals refer to like parts throughout the several views, a preferred embodiment of my ventilating apparatus is shown generally at 10 in FIG. 1. The ventilating apparatus is shown for illustrative purposes in FIG. 1 in a common embodiment found in restaurants and commercial applications, having a substantially rectangular hood enclosure 11 which is adapted to be installed in the area above a stove or grill 12. The ventilating apparatus may simply withdraw vapors through the hood by means of an exhaust fan, or the apparatus may additionally include means for introducing untempered outside air into the hood, without departing from the scope and spirit of my invention. For purposes of illustration only, an intake fan 13 provides outside untempered air under pressure through a duct 14 into the hood 11 to aid in the withdrawal of fumes through the exhaust apparatus. The fume laden air is drawn from the hood 11 through an exhaust duct 15 and is exhausted into the atmosphere by means of an exhaust fan unit 16. As also shown in FIG. 1, ductwork 17 may be provided surrounding the exterior of the hood enclosure 11 which has tempered air supplied thereto for discharge around the hood enclosure, for the purpose of aiding the flow of air into the bottom of the hood 11 and to inhibit the escape of fumes from the area of the hood. While such features may be desirable to proper functioning of the known exhaust hoods, they are not critical to my present invention.

The rectangular hood enclosure 11 shown in FIG. 1 has a front longitudinal wall 11a and a rear longitudinal wall 11b (not shown in FIG. 1). Two side walls 11c are attached to the front and rear longitudinal walls, and a top wall 11d and a bottom wall 11e (not shown in FIG. 1) are attached to the longitudinal and side walls to complete the rectangular enclosure 11. The bottom wall 11e of the enclosure 11 preferably has an open area somewhat larger than the area of the grill or stove 12 to facilitate collection of a maximum amount of vapors and grease particles arising from the grill area. It is apparent that the hood enclosure 11 may be constructed having other configurations than the rectangular configuration shown in FIG. 1.

Figure 2:
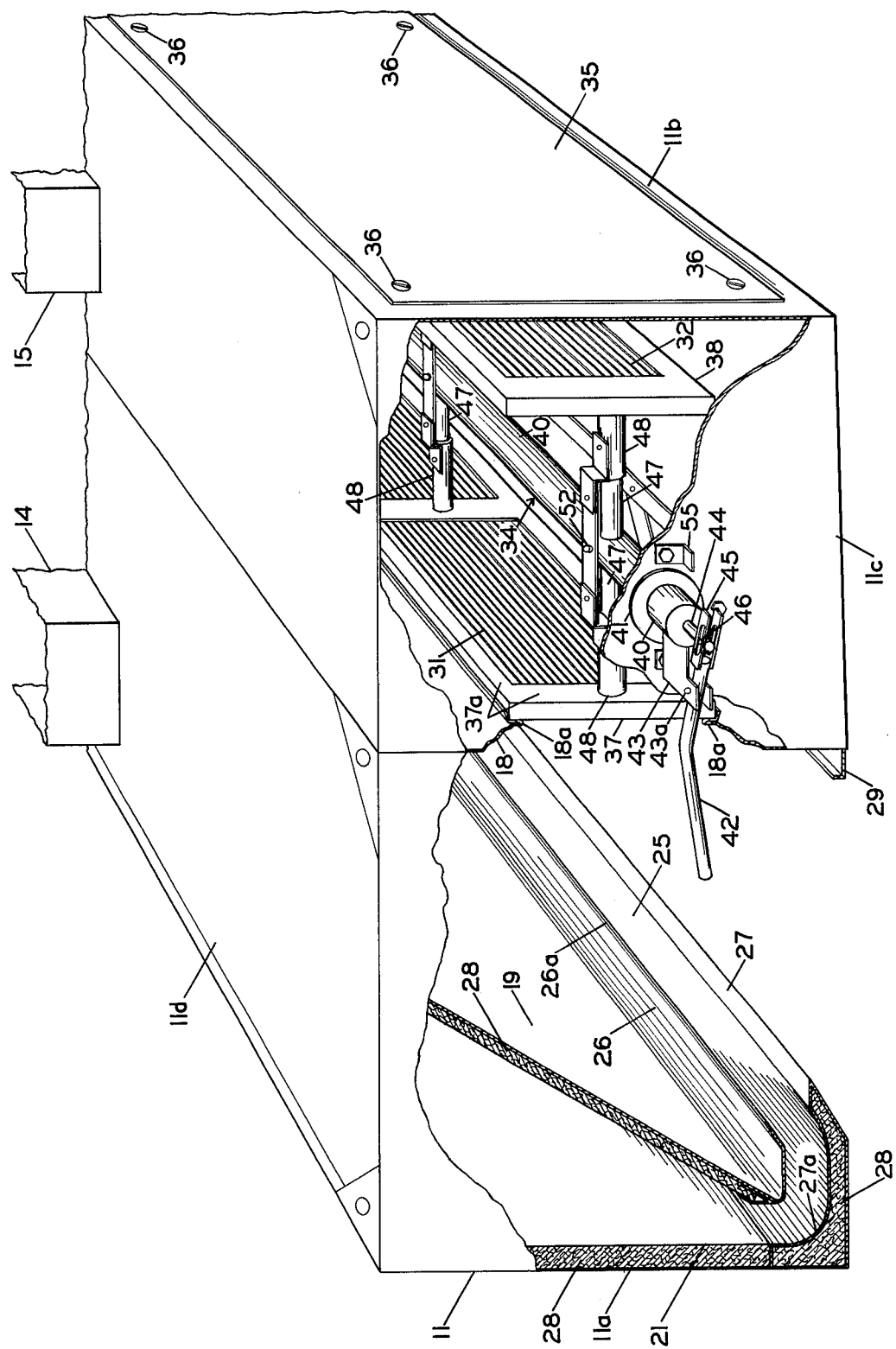
FIG. 2 is a perspective view of a portion of the ventilating apparatus of FIG. 1 with a portion of the side wall of the hood broken away to show the interior construction.

The perspective view of FIG. 2 shows the hood enclosure 11 portion of my apparatus with one of the side walls 11c partially broken away to show the interior construction of the apparatus. The interior of the hood enclosure 11 is divided into three chambers which are defined by the walls of the enclosure 11 and by a first interior wall 18 and a second interior wall 19. In the embodiment shown in FIG. 2 for illustrative purposes, an air injection type of hood is utilized, although as noted above, my present invention may be utilized with hoods that do not introduce untempered outside air into the hood area. As shown in FIG. 2 and in the cross-sectional view of FIG. 3, the hood enclosure 11 has an air intake chamber 21 formed between the longitudinal front wall 11a, the second interior wall 19 and the side walls 11c. A fume collection chamber 22 is formed between the first interior wall 18, the second interior wall 19, and a portion of the top wall 11d of the rectangular hood enclosure. An exhaust chamber 23 is formed between the first interior wall 18, the rear wall 11b, the side walls 11c, the bottom wall 11e, and the top wall 11d of the hood enclosure. An opening is provided in the first interior wall 18 to allow communication between the fume collection chamber and the exhaust chamber through a filter system, as will be explained in further detail below.

The second interior wall 19 preferably slants downwardly toward the front longitudinal wall 11a, to thereby funnel outside air introduced into the top of the air intake chamber 21 from the air duct 14 downwardly toward an air injection throat 25. The air injection throat 25 is formed between an upper throat panel 26 and a lower deflection plate 27, with the end of the throat panel 26 and the deflection plate 27 being spaced laterally apart to define the slot or throat 25 through which fast moving air passes out into the fume collection chamber 22. The deflection panel 27 has a curved deflector plate portion 27a which smoothly channels the air forced thereto from the air intake chamber 21, and changes its direction to exhaust the air into the fume collection chamber in a smooth flowing air stream. As shown in FIG. 2 for purposes of illustration, fiberglass or a similar insulating material 28 may be placed on the walls of the air intake chamber 21, and beneath the deflector panel 27, to insulate the sheet metal walls of the apparatus from the untempered outside air which is introduced into the air intake chamber 21. Such insulation is desirable to minimize condensation and accumulation of water and grease on the interior and exterior walls of the hood enclosure.

The upper throat panel 26 preferably extends horizontally outward from the second interior wall 19, and terminates with an upwardly turned lip 26a to form a trough which catches and disposes of the grease and condensate accumulating on the second interior wall 19. Another grease gutter or trough 29 is formed at the bottom of the first interior wall 18 to catch and allow disposal of grease and condensate which forms on the wall 18.

In order to remove a substantial portion of the grease and fume particles being exhausted to the atmosphere, at least one grease filter 31 is preferably interposed in the opening in the interior wall 18 which separates the fume collection chamber 22 from the exhaust chamber 23. As incidated above, the grease filter tends to become clogged and inefficient with continued use, and must be cleaned in order to re-establish its effectiveness. In conventional ventilating hoods, the grease filter must be removed from inside the fume collection chamber by an attendant, washed to remove the grease and accumulated sediment, and manually replaced. Generally, the ventilating system is shut down during removal and replacement of the filters.

My exhaust hood and filter apparatus may remain operating during replacement of the grease filter since it includes at least a second grease filter 32 which is identical to the first grease filter 31, and which is held in reserve within the exhaust chamber as long as the grease filter 31 is emplaced in the operating position in the opening between the fume collection chamber and the exhaust chamber. When the grease filter 31 becomes clogged with grease and sediment and is substantially reduced in efficiency, a filter exchanger portion 34 of my apparatus may be employed to exchange the position of the second grease filter 32 with that of the first grease filter 31. The first grease filter 31 will now be in the reserve position within the exhaust chamber 23 and may be removed for cleaning or washed in place within the exhaust chamber. An access door 35 is provided in the back wall 11b of the hood enclosure to allow the attendant to obtain access to the removable grease filter in the reserve position. The access door is maintained in place by any desired retaining means, such as quick release screws 36 shown illustratively in FIG. 2.

The filter exchanger portion 34 shown in FIG. 2 may be manually operated to exchange the grease filter 32 in the reserve position with the grease filter 31 in the operating position. The filter exchanger portion 34 shown in FIG. 3, and in the detailed drawings of FIGS. 4 and 5, utilizes a pair of filter holders 37 and 38. The filter holders 37 and 38 are constructed to releasably hold the grease filters 31 and 32. The grease filters 31 and 32 themselves may consist of a plurality of individual filter units, which may be emplaced within the filter holders 37 and 38 to form a filter element that extends along the entire exhaust opening in the first interior wall 18.

The filter exchanger 34 shown illustratively in FIG. 2 is adapted to provide for manual exchange of the positions of the first filter holder 37 and the second filter holder 38. In a preferred construction, the filter exchanger 34 includes a central shaft member 40 having a hollow interior, and which is mounted for rotation within the exhaust chamber by bearings 41 mounted in the side walls 11c at either end of the exhaust chamber. The central shaft member 40 preferably extends outside of the exhaust chamber a short distance at one end of the exhaust chamber. A lever 42 is pivotally mounted by a pivot pin 43a to a bracket 43, which is itself rigidly attached to the periphery of the extending portion of the shaft 40. A central rod 44, which extends into the middle of the shaft member 40, is slidingly attached at its outward end to the lever 42. The attachment of the lever 42 to the bracket 43 and rod 44 allows the shaft member 40 to be rotated by the action of an attendant turning the lever 42. The lever 42 and the rod 44 are slidingly attached together by means of a grooved bracket 45 attached to the end of the lever 42, and by a stationary pin 46 which is affixed to the rod 44 and which rides in the grooves of the grooved bracket 45. The attachment of the lever 42 to the rod 44 allows the attendant to move the rod 44 inwardly and outwardly by pulling outwardly or inwardly respectively on the lever 42.

The filter holders 37 and 38 are mounted to the central shaft member 40 for inward and outward movement by means of a plurality of pairs of lateral arm members 47 which are rigidly mounted to and extend radially from the central shaft member 40, and by pairs of corresponding sleeve members 48 which are rigidly attached to the filter holders 37 and 38 and which slidingly fit over and engage the lateral arms 47 therein to thereby support the filter holders on the central shaft member 40. The filter holders 37 and 38 are shown in their retracted positions in FIGS. 4 and 5, wherein the central shaft member 40 may be rotated by the lever 42 to interchange the positions of the filter holders 37 and 38. The inward retraction of the filter holders is necessary in order to allow the filter holders to clear the edges of the opening in the first interior wall 18 and an inwardly sloping flanged lip 18a that is preferably formed around the opening.

Figure 4:
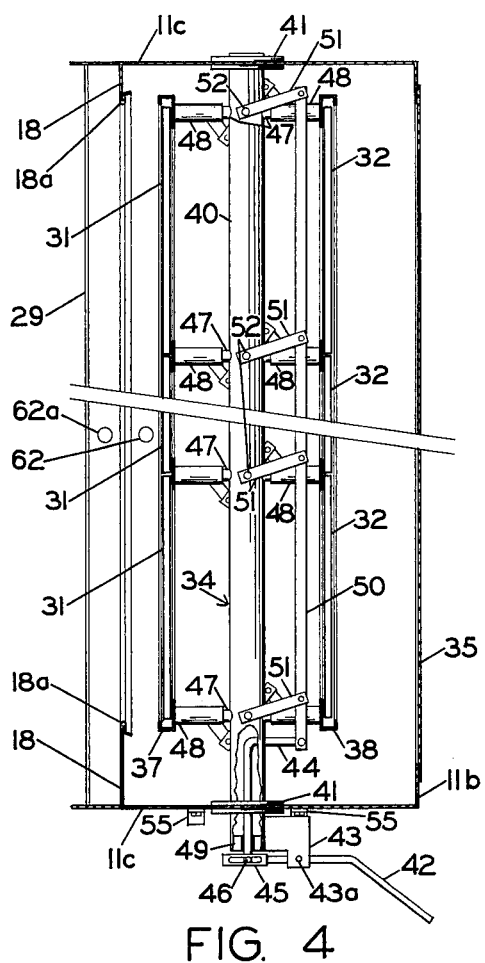
FIG. 4 is a cross-sectional view of the exhaust chamber portion of my apparatus taken along the line 4—4 of FIG. 3, showing the filter exchanger in the exhaust chamber.
Figure 5:
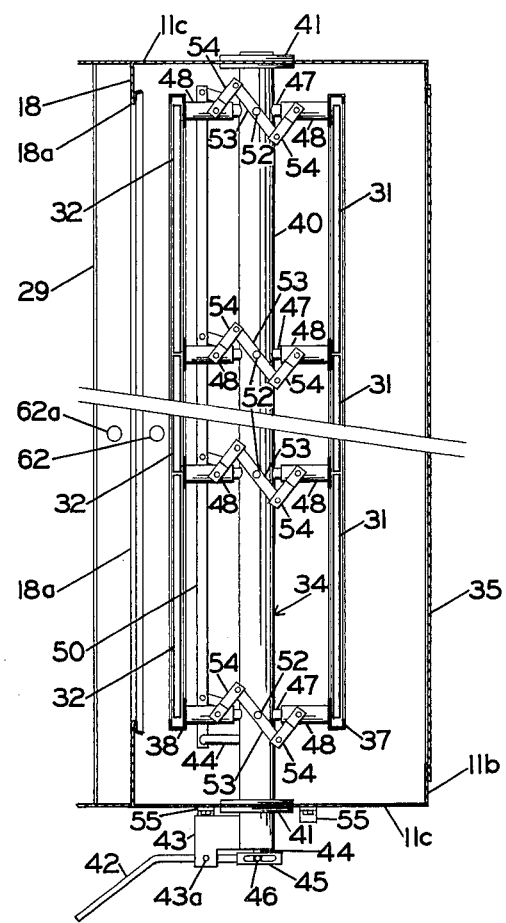
FIG. 5 is another cross-sectional view of the exhaust chamber portion of my apparatus taken along the line 5—5 of FIG. 3 showing the filter holders in reversed position from that shown in FIG. 4.

The mechanism for retracting and extending the filter holders 37 and 38 is best shown in FIGS. 4 and 5. With reference to FIG. 4, the central rod 44 passes into the hollow interior of the central shaft 40 through a housing 49 which guides the rod and holds it for inward and outward motion. The portion of the rod 44 within the central shaft is bent outwardly as shown, and extends out of the central shaft 40 through a slot (not shown in FIG. 4) and is pivotally attached to a connecting link 50. The connecting link 50 is itself pivotally attached to a plurality of lateral links 51 which are rigidly attached at their opposite ends to rotatable shafts 52 which are journaled to the walls of the central shaft member 40, and which extend through the shaft member and outwardly therefrom on the side of the shaft member opposite the lateral links 51.

Referring to FIG. 5, the plurality of shafts 52 journaled through the central shaft member 40 are rigidly attached at their other ends to a plurality of central links 53 which are rigidly attached at the center thereof to the rotating shafts 52. Side links 54 are pivotally attached to the central link 53 at the ends thereof and extend outwardly to pivotal mounting to the sleeve members 48. Thus, rotation in a clockwise direction of the shafts 52 will cause the filter holders 37 and 38 to be extended, whereas rotation of such shafts in the opposite direction will cause retraction of the filter holders. With reference to FIG. 4, it is seen that when the lever 42 is pulled outwardly by an attendant, the lateral links 51 will be rotated by the connecting links 50 in a counterclockwise direction, with the shafts 52 rotating therewith and retracting the filter holders 37 and 38. Conversely, when the lever 42 is moved inwardly by the attendant, the filter holders 37 and 38 will be extended such that the appropriate filter holder will be fully extended into the opening in the interior wall 18 and into engagement with the lip 18a around the opening on the interior wall. The filters held by the filter holder in the reverse position are, as indicated above, accessable to the attendant after removal of the access door 35. It is preferred that the filters 31 and 32 be firmly held during operation by the filter holders 37 and 38, but that they be readily removable by the attendant to allow cleaning.

As indicated above, the positions of the filter holders 37 and 38, and the filter held therein, may be interchanged when the filter holders are retracted by the action of an attendant manipulating the lever 42 to rotate the central shaft member 40. To aid in the proper positioning of the filter holders, metal tabs 55 are preferably attached to the side wall 11c on either side of the central shaft 40, and project outwardly in position to engage the bracket 43 at the extremes of the desired rotation of the lever 42. Proper positioning of the filter holders in the opening in the interior wall 18 is facilitated by the flanged lip 18a. The flange of the lip 18a slopes inwardly toward the opening to guide the filter holder, as it is extended, into a position in which the filter holder and filters therein will completely cover the opening in the wall 18.

A preferred arrangement and construction of the filter holders is shown in FIG. 6, which is a cross-sectional view of the filter holder 37 with the filter 31 mounted therein. The construction of the filter holder 38 is identical to the filter holder 37 shown in FIG. 6. The filter holder 37 consists of a rectangular frame having sides composed of U-shaped channel members 37a into which the rectangular filters may be inserted. The filter holders are preferably spring loaded to firmly retain the filters within the channels of the holders. As best shown in the cross-sectional view of FIG. 6, a plurality of leaf springs 56 are affixed to the bottom of one of the channel members of the filter holder 37 and to a rigid metal strip 57 which runs the length of the filter holder to resiliently mount the rigid strip 57 to the one channel member. The springs 56 are preferably attached to the bottom of the filter holders and to the metal strip 57 to prevent accidental dislodging of the springs and metal strip during insertion and removal of the filters. Insertion of a filter is readily accomplished by inserting the bottom of the filter into the bottom of the channel of the filter holder to engage with the metal strip 57, and to compress the springs 56 until the top of the filter clears the upper channel member of the filter holder. The filter may then be released to engage with the upper channel member and to assume the position shown in FIG. 6 wherein the filter is resiliently restrained within the channels of the filter holder. Removal of the filter is similarly readily accomplished by pushing down on the filter until the top of the filter clears the top channel of the filter holder, thereby allowing the filter to be turned forwardly and removed from the holder.

Figure 3:
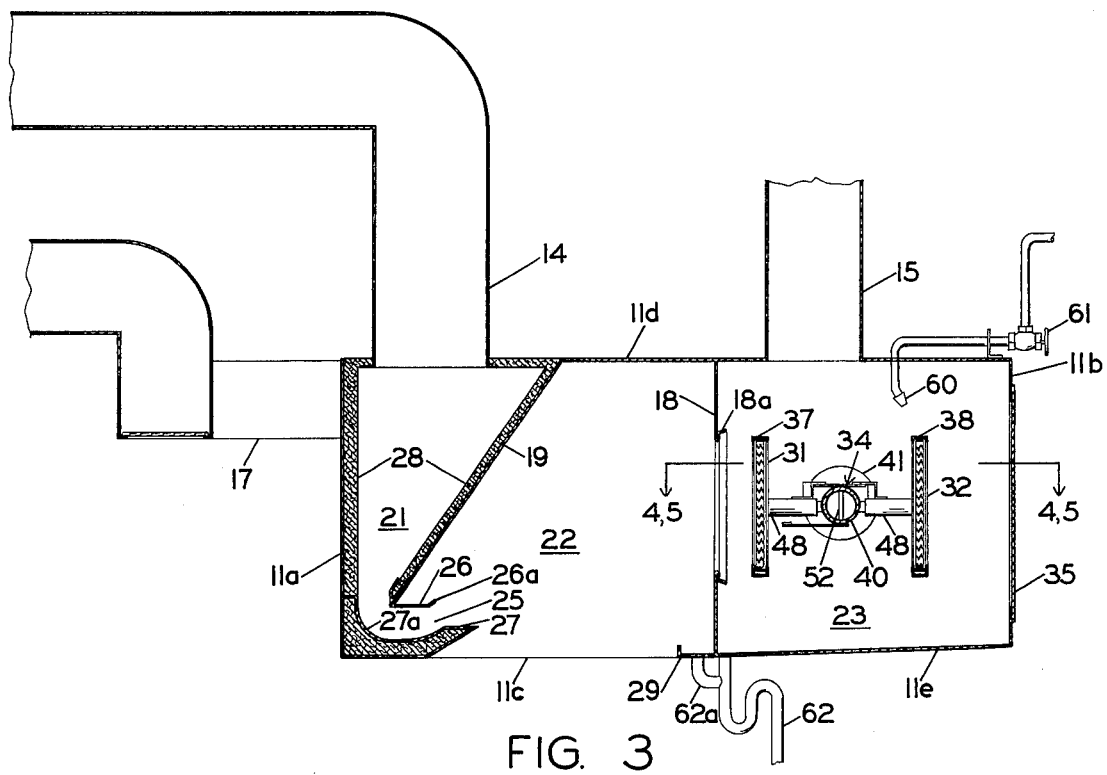
FIG. 3 is a cross-sectional view taken along line 3—3 of FIG. 1.

My exhaust hood and filter apparatus 10 may also provide for automatic cleansing of the reverse filter without the necessity for removal of the filter by the attendant. A plurality of wash nozzles 60 are mounted in the exhaust chamber of the apparatus as shown in FIG. 3 in position to spray water, or a cleansing solution, into the reverse filters. In the embodiment shown, flow of cleansing solution to the wash nozzles 60 is manually controlled by the use of a manually operated valve 61 which may be opened and closed by an attendant from outside of the hood enclosure. In conjunction with the wash nozzles 60, the bottom wall 11*e* of the hood enclosure slopes downwardly as shown in FIG. 3 to drain the cleansing solution to a drain pipe 62. A branch drain pipe 62*a* drains liquid from the trough 29 to the drain pipe 62.

While the mechanism for exchanging the filter holders 37 and 38 has been shown in the embodiment described above for illustrative purposes, it is apparent that a number of other mechanical devices may be utilized for retracting and extending radially the filter holders and for rotating the filter holders between the reserve and operating positions. For example, a rack and pinion system may be utilized to extend and retract the filter holders, wherein the central rod operated by the lever 42 has a gear rack formed thereon which is in engagement with a rotating pinion, with the pinion being in engagement with a pair of racks which extend outwardly in opposite directions to attachment with the filter holders. Similarly, toggle mechanisms, or other equivalent mechanisms may also be utilized to extend and retract the filter holders.

It is further apparent that the exchange of the positions of the filter holders may be automatically controlled. For example, an electric motor (not shown) may be timed to retract the filter holders and filters, interchange their positions, and extend the clean filter into the opening in the interior wall 18, while the dirty filter is left in the reserve position where the wash nozzles 60 may be utilized to clean the dirty filter. The cleaning of the filters may be timed automatically such that when the dirty filter is placed in the reserve position, cleaning solution is sprayed on it for a predetermined period of time.

It is understood that my invention is not confined to the particular construction and arrangement of parts herein illustrated and described, but embraces all such modified forms thereof as come within the scope of the following claims.

I claim:
1. Ventilating apparatus, comprising:
   a. an exhaust hood having a fume collection chamber, an exhaust chamber, and an interior wall between said chambers having an opening therein to allow fumes to pass from said collection chamber to said exhaust chamber;
   b. a filter exchange assembly having a pair of movable filter holders each for holding at least one filter selectively in operating position across said opening and in reserve position within said exhaust chamber; and
   c. means for moving said filter holders for alternatively positioning one of said filter holders in operating position while the other is in reserve position, said means for moving said filter holders having:
      1. a rotatable central shaft member mounted to said exhaust hood for rotation in said exhaust chamber;
      2. means for movably mounting said filter holders to said central shaft member for retraction of said filter holders toward said central shaft member and extension away therefrom; and
      3. means for selectively extending said filter holders outwardly from said central shaft member to an extended position wherein one of said filter holders may be in operating position in said interior wall opening and for retracting said filter holders inwardly toward said central shaft member to a retracted position, whereby a filter held by the one of said filter holders in the operating position may be exchanged with a filter held by the other if said filter holders in a reserve position by retraction of said filter holders to their retracted position, rotation of said central shaft member to interchange the positions of said filter holders, and extension of said filter holders to their extended position wherein the other of said filter holders is in the operating position.

2. The ventilating apparatus of claim 1 including at least one wash nozzle for spraying a washing solution onto the filter held by the one of said filter holders in said reserve position and a drain for draining the solution from the exhaust chamber.

3. The ventilating apparatus of claim 1 wherein said means for movably mounting said filter holders to said central shaft member includes lateral arm members rigidly mounted to and extending radially from said central shaft member and sleeve members rigidly mounted to said filter holders which are adapted to slidingly fit over and engage said lateral arm members for support thereon, and wherein said means for extending and retracting said filter holders includes a lever mounted to said central shaft member for manual operation from outside said exhaust hood and a linkage mechanism mounted to said central shaft member and connected to said lever for driving said filter holders inwardly and outwardly as said lever is operated and wherein said lever is adapted to be operated to rotate said central shaft member.

4. The ventilating apparatus of claim 3 wherein said central shaft member has a hollow interior, and wherein said linkage mechanism includes a central rod member movable inwardly and outwardly in the hollow interior of said central shaft member, said rod member being pivotally connected at one end to said lever to be moved thereby, a connecting link member pivotally attached to said central rod member to move therewith laterally along said central shaft member, and linkages pivotally attached to said connecting link members and also pivotally attached to said sleeve members, said linkages adapted to transmit the movement of said connecting link along said central shaft member to movement of said filter holders selectively toward and away from said central shaft member.

* * * * *